United States Patent [19]

Silva et al.

[11] Patent Number: 5,027,919
[45] Date of Patent: Jul. 2, 1991

[54] FLUID FRICTION CONTROLLER

[75] Inventors: Gabriel Silva, Liverpool; John D. Moeller, Clay, both of N.Y.

[73] Assignee: Young & Franklin, Inc., Syracuse, N.Y.

[21] Appl. No.: 459,306

[22] Filed: Dec. 29, 1989

[51] Int. Cl.⁵ .............................................. F01N 7/18
[52] U.S. Cl. .................... 181/241; 181/271; 181/277; 137/813; 251/122; 138/45; 138/46
[58] Field of Search ............... 181/212, 226, 234, 241, 181/271, 277, 278, 269; 138/45, 46; 137/810–813, 829, 832, 833, 839; 251/120–122, 124

[56] References Cited

U.S. PATENT DOCUMENTS

| | | | |
|---|---|---|---|
| 2,240,119 | 4/1941 | Montgomery et al. | 251/124 X |
| 2,598,208 | 5/1952 | Bailey | 138/45 |
| 3,180,360 | 4/1965 | Pavlin | 251/124 X |
| 3,545,466 | 12/1970 | Bowles | 137/839 X |
| 3,703,273 | 11/1972 | Illing | 251/122 |
| 4,003,405 | 1/1977 | Hayes et al. | 138/40 |
| 4,150,696 | 4/1979 | Meier et al. | 138/44 |
| 4,601,310 | 7/1986 | Phillips | 251/122 X |

Primary Examiner—Brian W. Brown
Attorney, Agent, or Firm—Wall and Roehrig

[57] ABSTRACT

A fluid friction controller that includes an outer member having a first friction control surface and an inner member having a second friction control surface. The control surfaces coact to define an elongated orifice that diverges from its entrance toward its exit. The length of the orifice is related to the angle of divergence so that the flow of a fluid passing therethrough remains attached to the control surfaces and the dynamic pressure in the flow does not exceed the static pressure at any point along the length of the orifice.

17 Claims, 3 Drawing Sheets

FLUID FRICTION CONTROLLER

BACKGROUND OF THE INVENTION

This invention relates to a friction controller for reducing the noise in a fluid flow system in which the flow moves in one direction.

Valve noise is becoming more of a concern because of the increased interest in environmental safety. Numerous valves have been developed over the last 30 years in a attempt to either suppress or control noise produced by different fluids in transit. The term fluid, as herein used, refers to either a liquid or a gas. In the earlier devices, valves and the surrounding flow channels were simply wrapped with acoustical materials for absorbing sound. Later designs involved attenuators which were placed directly in the flow stream to either divide the flow into smaller sub-streams or shape the flow into a desired geometry. Although these devices provided limited noise suppression under controlled conditions, they failed to address all the factors that trigger noise producing vibrations in a flow system. These factors can be either fluid related or mechanical in nature. The fluid related factors include such things as cavitation, flow turbulence and fluid separation in and about flow boundary regions. Mechanical factors, which are typically caused by obstructions in the flow path include such things as shock related stresses and transient vibrations.

Two approaches have been proposed for combatting these factors. The first is directed towards eliminating or avoiding noise producing conditions. The second involves attenuating the noise once it has been produced. Most noise suppression devices follow the latter approach and include such things as static mixes, tube bundles, filters, flow separators, dampers, and diffusers. All attenuators have some type of structure that disrupts the normal flow of the fluid thereby producing their own design problems. Generally, fixed attenuators can handle, only a limited range of frequencies and flow noise can be produced outside this frequency range.

Variable or tunable attenuators have been devised which can be adjusted to accommodate changes in frequency produced at different flow rates. The tunable attenuator is typically made a part of a flow control valve stroke mechanism and is automatically adjusted in response to changes in the valve stroke. Examples of such variable tunable attenuators includes cascade chambers, stacked discs, nested cylinders, parallelly aligned resistive elements and tortuous flow paths.

Although the tunable attenuator will reduce noise under varying flow conditions, the amount of noise suppression that is attainable is still rather limited. These devices oftentimes produce changes in the velocity profile of the flow as the stroke is being adjusted which, in turn, produces pressure disturbances and discontinuous flow patterns. Typically, the variable attenuator will include several orifices or chambers that are partially opened or closed to selectively distribute the flow as it moves through the valve stroke. High flow velocities can thus be generated under certain operating conditions. This, in turn, will cause cavitation and separation along the flow boundaries, producing unwanted noise.

Other problems associated with tunable attenuators are design related. The attenuator represents an extra part in the flow system and generally requires a significant amount of additional mounting space. The attenuation system is not only bulky, but is also expensive to manufacture and difficult to assemble and maintain. Attenuator flow passages tend to be restricted and therefore are easily clogged with contaminants unless high filtration requirements are met.

In U.S. Pat. No. 4,150,696 to Meier et al., three separate approaches for achieving improved noise suppression are proposed. The first approach involves placing some type of obstruction within the flow stream to divide the main flow into smaller laminar subflows. Wire grids and the like are used for this purpose. The second approach relates to changing the geometry of the main flow stream. In this embodiment, a deformable elongated screen is placed downstream from a thin edge orifice. Air is either blown through the screen or suction applied thereto to alter the flow pattern as the fluid passes through the screen region. Lastly, Meier et al. suggests shifting the frequency of the flow noise into a range that is outside the audible range. It should be noted that all of the Meier approaches require the use of flow interrupting devices that are inserted directly into the flow path. Accordingly, these devices disturb the flow and create unwanted flow related problems.

Hayes et al., in U.S. Pat. No. 4,003,405, discloses a device for maintaining laminar flow conditions within a flow system. The device consists of a circular casing having a continuous inlet that encircles the outer periphery of the casing. The entering fluid is directed inwardly towards the center of the casing where it is abruptly turned 90° before being discharged through a relatively small diameter discharge pipe. The circular flow passage within the casing converges rapidly as it approaches the central discharge opening. The passage functions as a restriction to flow which reduces the flow to a point where it remains laminar within the casing. Although the flow through the Hayes et al. casing may be laminar, noise can still be generated, particularly where the flow turns into the restricted discharge region due to cavitation and/or flow separation at the system boundaries.

SUMMARY OF THE INVENTION

It is therefore an object of the present invention to improve flow controllers for suppressing noise in a flow system.

It is a further object of the present invention to provide a quiet flow controller that can handle a relatively wide range of flow rates.

A further object of the present invention is to provide a flow controller having an elongated orifice that diverges in the direction of flow so as to maintain the static pressure above the dynamic pressure at any point along the length of the orifice.

A still further object of the present invention is to suppress noise in a flow system without having to insert flow interrupting components into the flow path.

Another object of the present invention is to control flow conditions in a variable flow system so that vibration producing noise will not be generated within the system.

It is another object of the present invention to provide flow controllers with diverging friction control surfaces that produce controlled work on the fluid passing therebetween which prevent noise generating vibrations from being produced in the flow system.

Yet another object of the present invention is to provide a simple variable flow controller that delivers quiet performance by maintaining closely regulated flow conditions during throttling to avoid cavitation and fluid separation along the flow boundaries over a desired operating range.

These and other objects of the present invention are attained by means of a flow controller that includes an outer member having a first friction control surface and an inner member having a second friction control surface. The two surfaces are arranged to define an elongated orifice that diverges from a fluid inlet region toward a fluid exit region. The pressure of the fluid entering and leaving the orifice is controlled so that the difference in pressure will not exceed a predetermined value. The angle of divergence of the orifice is related to its length so that the flow will remain attached to the friction control surfaces along the length of the orifice and at the same time the dynamic pressure will not exceed the static pressure in the flow at any point along the length of the orifice.

BRIEF DESCRIPTION OF THE DRAWINGS

For a better understanding of these and other objects of the present invention, reference is had to the following detailed description of the invention which is to be read in conjunction with the accompanying drawings, wherein.

DETAILED DESCRIPTION OF THE PREFERRED EMBODIMENT

Typically, valves are used to control flow and to transfer energy in a fluid flow system. During the control and energy transfer processes, some of the internal energy is dissipated into the surrounding environment in the form of heat. The remaining energy is radiated acoustically as noise that is produced by vibrations or transient motion. The dampening effect of the system defines what portion of the internal energy is absorbed as heat and what portion generates noise. The valve design and its operating parameters to a large extent determine the rate at which noise and heat are generated. The present flow controller is specifically designed to avoid these factors which lead to noise producing vibrations in a flow system. In the main embodiment of the present invention, the controller resembles a spool-type valve, however, its geometry has been specifically tailored to avoid all noise inducing phenomena associated with conventional pressure and flow controllers. These include cavitation, turbulent flow, fluid separation and obstructions in the flow path. It is important to note that unlike many known attenuators, flow shapers, or frequency shifters, the present invention does not depend upon devices which might obstruct or disrupt the fluid flow moving through the device for its successful operation.

Figure 1:
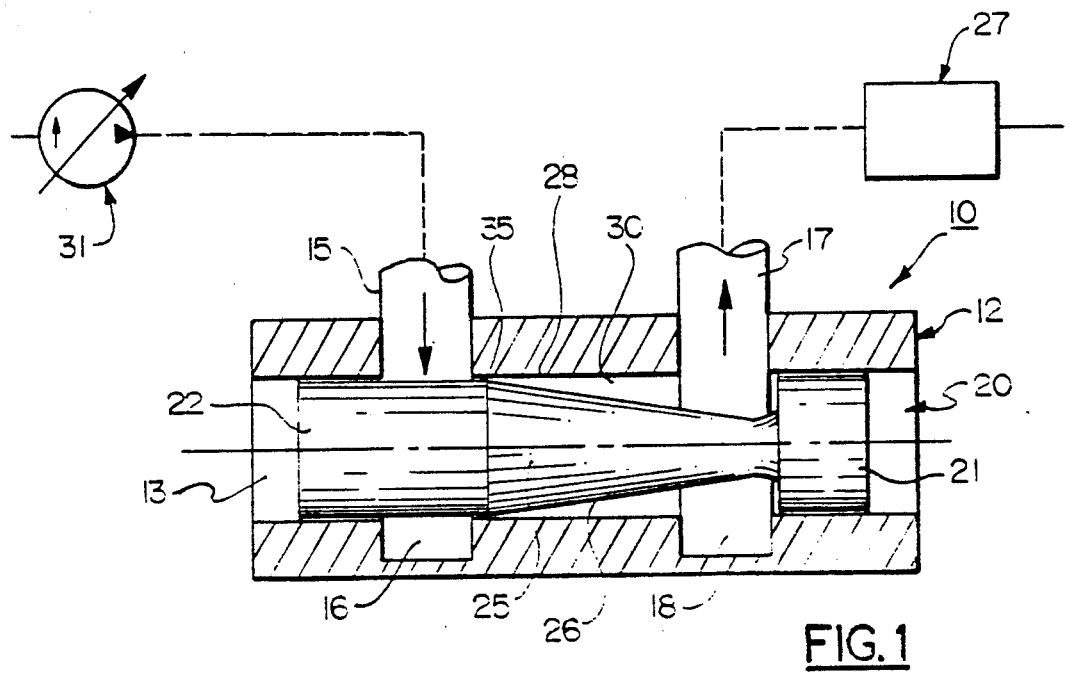
FIG. 1 is a schematic side elevation in section showing a first embodiment of the invention.

Turning initially to FIG. 1, there is shown a flow controller, generally referenced 10, that embodies the teachings of the present invention. The controller can be used to control flow or transfer energy in a fluid flow system while at the same time substantially avoiding the factors which typically generate noise producing vibrations. The controller includes an outer housing member 12 and an inner member 20 which is slidably contained within cylindrical opening 13, formed in the outer housing member. A supply line 15 is adapted to bring fluid under pressure into an annular inlet region 16 that surrounds the housing opening. An annular exit region 18, which surrounds the housing opening, is located a predetermined distance from the annular inlet region. A discharge line 17 is connected to the exit region for delivering fluid to downstream equipment serviced by the controller or returning the fluid to a supply tank.

The inner member 20 is mounted within the housing so that it can be selectively positioned within the opening 13. The inner member contains a pair of cylindrical end bearings 21 and 22 that ride in close sliding relationship with the inside wall of the opening. Although not shown, appropriate seals may be furnished to prevent fluid contained within the inlet and exit regions from passing between the bearings and the inside wall of housing opening. A tapered section 25 is mounted between the two bearing units that have a conical shaped outer surface 26 that tapers downwardly at a predetermined angle from the fluid inlet region towards the fluid exit region.

The tapered surface 26 of the inner member coacts with a portion of cylindrical interior surface 28 of the housing between the inlet and outlet regions to define an elongated diverging orifice 30. Surfaces 26 and 28 are designed to perform work upon a fluid flowing through the orifice and shall be referred to herein as frictional control surfaces.

Fluid is delivered into the inlet region by means of a variable pressure compensating pump 31 connected to the supply line 15. The pump insures that the fluid pressure at the inlet region will not exceed a predetermined maximum value. The inlet region of the controller is designed so that the entrance to the elongated orifice 30 is completely wetted by fluid during all phases of the control operation. A resistance 27 is also placed in the discharge line 17 of the controller which further regulates the fluid pressure at the exit region 18. The resistance may, in practice, be the equipment serviced by the controller or simply the result of fluid being returned to a supply tank provided that the outlet pressure is always greater than the vapor pressure of the fluid thereby preventing vapor bubbles from forming in the orifice.

When the inner member of the controller is positioned as shown in FIG. 1, the entrance to the elongated control orifice is closed and fluid is prevented from moving therethrough. Moving the inner member to the left as viewed in FIG. 1 opens the entrance to the orifice and permits fluid to flow from the inlet region into the exit region under controlled conditions. The length of the orifice and the angle of divergence between the two friction control surfaces are very specifically related so that the fluid passing through the orifice between the inlet and exit regions remains attached to the friction control surfaces along the entire length of the orifice for all inlet pressures up to and including the predetermined maximum inlet pressure value for the system.

The angle of divergence of the control orifice is further designed to produce a controlled pressure drop in the flow as it passes through the orifice. The friction control surfaces perform work on the fluid so that the dynamic pressure, that is the pressure produced by the flow velocity within the orifice region, cannot exceed the fluid static pressure at any point along the orifice between the inlet and exit regions.

Under the control of the friction control surfaces, the streamlines which characterize flow patterns remain smooth and quiet throughout the orifice region. The divergent control surfaces further act to produce a uniformly decreasing pressure gradient in the direction of flow and regulate the velocity of the fluid along the boundary walls. The surface prevents rapid acceleration or deceleration of the fluid during the throttling process thereby avoiding turbulence and flow reversals in the critical region which lead to cavitation. Lastly, it should be noted that there are no obstructions in the flow path of the present controller to obstruct the flow and, as a result, fluid transients are prevalent in flow systems where attenuators or other flow interrupting devices are employed.

As should be evident from the disclosure above, the elongated diverging control orifice of the present controller dictates that the highest dynamic pressure will always occur at the region of highest pressure which is at the entrance to the orifice. By uniformly decreasing the pressure gradient along the orifice under controlled conditions, the lowest dynamic pressure will correspondingly occur at the region of lowest static pressure which is at the exit region. As will be explained below, this high-high/low-low relationship remains constant with changes in the flow rate provided that the maximum inlet pressure value is not exceeded.

Figure 2:
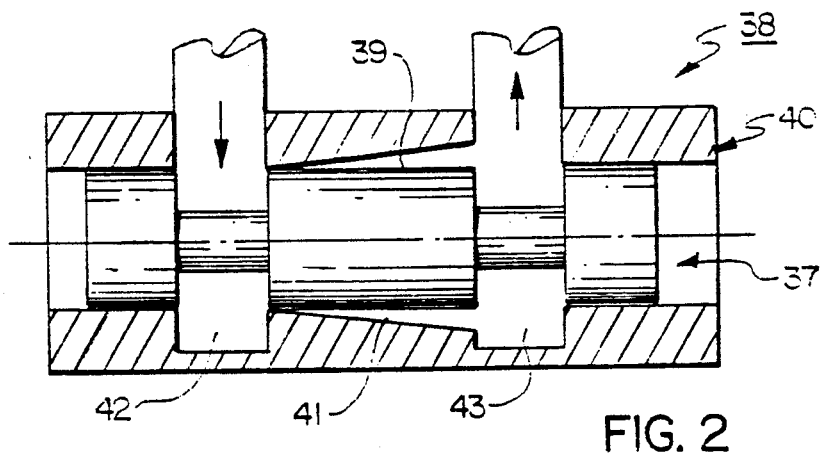
FIG. 2 is a schematic side elevation in section showing a second embodiment of the invention.

It should be obvious from the discussion above that the present controller design can be equally applied to multiple passage valves such as three-way and four-way valves. By the same token, as shown in FIG. 2, the inner member 37 of controller 38 may contain a cylindrical friction control surface 39 and the outer member or housing 40 contain the second tapered friction control section 41. The two friction control surfaces again define a diverging orifice of predetermined length that is configured as described above so that the fluid remains attached to the control surfaces along the entire length of the orifice and wherein the dynamic pressure does not exceed the static pressure at any point along the length of the orifice. Other changes in the geometry of the orifice can also be made without departing from the teachings of the invention. The friction control surfaces, for example, may be arcuate in form rather than linear. Similarly, the orifice does not have to be annular in shape and may take any suitable form depending upon the particular application. Throttling can be achieved by moving the inner member as described above, or alternatively, by holding the inner member stationary and selectively repositioning the outer member.

Figure 3:
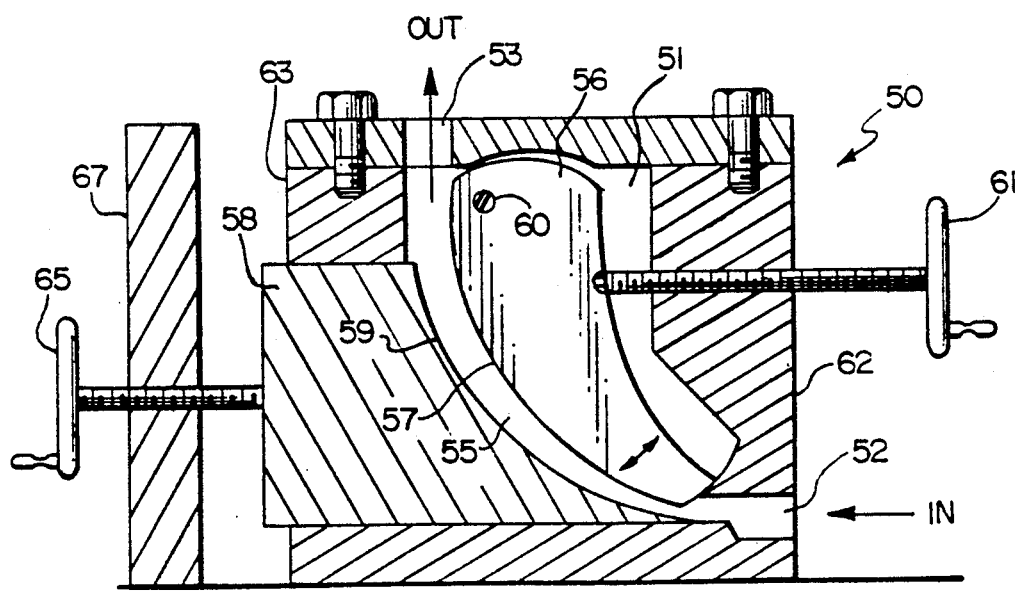
FIG. 3 is a further schematic side elevation in section showing a still further embodiment of the invention.

Turning now to FIG. 3, there is shown another embodiment of the present invention that permits further adjustment of the orifice geometry. Housing 50 again contains an interior chamber 51. An inlet port 52 provides a fluid entrance to the chamber and a second exit port 53 permits the entering fluid to be discharged from the housing. An elongated orifice 55 is defined by an inner member 56 having an arcuate shaped friction control surface 57 and an outer member 58 having a second arcuate shaped friction control surface 59. The inner member is pivotably supported in the housing near the discharge region by means of a pin 60. A threaded crank 61 is contained in stationary side wall 62 of the housing which permits the angular repositioning of the inner member with regard to the outer member whereby the angle of divergence of the orifice can be selectively adjusted. The outer member 58 is slidably contained in the opposing side wall 63 of the housing and can be selectively positioned in regard to the inner member by means of a second crank mechanism 65, threadably contained in stationary member 67. Repositioning the outer member changes the cross-sectional area of the orifice. As can be seen, the geometry of the elongated orifice can be selectively altered to meet changing flow conditions and system demands. Again, the changes in the geometry can be achieved provided the flow remains attached to the control surfaces and the dynamic pressure does not exceed the static pressure along the length of the orifice.

Figure 4:
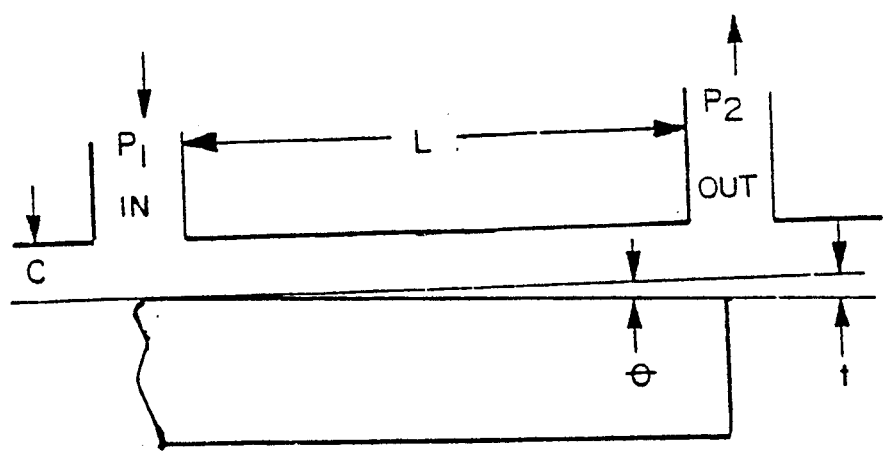
FIG. 4 is a partial enlarged side elevation similar to that shown in FIG. 1 further illustrating the geometry of the elongated orifice.

The theory of operation of the present invention will be explained in greater detail with reference to the schematic drawing shown in FIG. 4. It will be assumed for purposes of explanation that the pressures $P_1$ and $P_2$ are constant and $P_1 > P_2$. For quiet flow conditions wherein the flow remains attached to the walls of the orifice, the total pressure drop $\Delta P_T = (P_1 - P_2)$ across the orifice is proportional to the flow rate Q:

$$\Delta P_T = K \times Q \qquad (1)$$

where:

$$K = f(\mu, L, c, D, K_1)$$

and:

$\mu$ = fluid viscosity
L = the flow path length of the orifice
c = the entrance clearance
D = the maximum diameter of the inner member
$K_1$ = the effect of other geometry related features For the configuration shown in FIG. 4, the values of K and $K_1$ (assuming no eccentricity) are as follows:

$$K = \frac{12 \mu L}{\pi D C^3} K_1 \qquad (2)$$

where:

$$K_1 = \frac{(2 + t/c)}{2(1 + t/c)^2}$$

and:

t = tan $\theta$ L

The pressure drop across the orifice for a given flow rate Q can now be defined as:

$$\Delta P_T = \frac{12 Q \mu L}{\pi D C^3} \cdot \frac{(2 + t/c)}{2(1 + t/c)^2} \qquad (3)$$

The effects of fluid viscosity changes due to pressure are not taken into consideration in equation (3). Experiments carried out on this type of flow controller, however, have shown that a more accurate prediction of the pressure differential across the orifice can be made when the viscosity effects due to changes in pressure and temperature are considered. This relationship is as follows:

$$\Delta P_T = \frac{\ln\left[1 + \frac{12 Q\mu L}{\pi D c^3} \cdot \frac{(2 + t/c)}{2(1 + t/c)^2} \times H\right]}{H} \quad (4)$$

where:

$$H = [\alpha + \beta(\rho e)]$$

and:
 α = the pressure effect of viscosity
 β = the temperature effect of viscosity
 ρ = the density of the fluid
 e = the specific heat of the fluid As can be seen by use of this relationship, the angle of divergence, and the length of the orifice can be determined for a maximum pressure drop across the orifice.

Once an orifice geometry has been selected for a predetermined pressure range, the geometry must be further analyzed to insure that the dynamic pressure ($P_d$) does not exceed the static pressure ($P_S$) at any point along the length of the orifice. The pressure information can be obtained either analytically or empirically.

The dynamic pressure in the flow stream passing through the orifice is related to the flow velocity as follows:

$$P_d = \tfrac{1}{2}\rho V^2 \quad (5)$$

where:
 V is the flow velocity
and:

$$V = Q/A \quad (6)$$

where:
 Q is the rate of flow at a given point
 A is the flow area at that point The total pressure in the flow at any given point along the flow path is $$P_T = P_S + P_d \quad (7)$$

It has been found experimentally that extremely quiet performance can be obtained when the dynamic pressure is maintained at some value less than half the total pressure.

Figure 5:
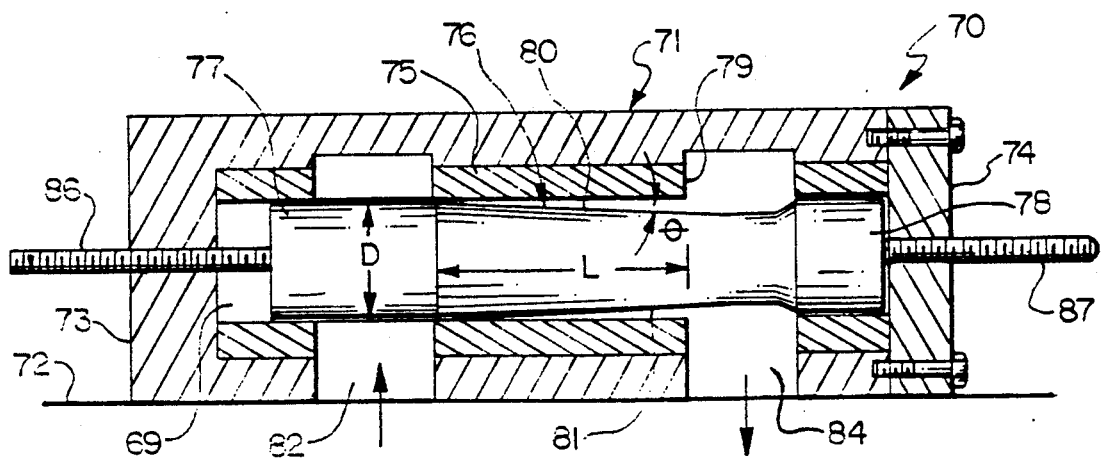
FIG. 5 is a side elevation in section showing the construction of a test stand used to verify the noise eliminating features of the present invention.

A test fixture as illustrated in FIG. 5 has been constructed to verify the noise eliminating features of the present invention. The fixture includes a controller 70 having a hollow housing 71 that is firmly mounted upon a stable base surface 72 located in a quiet area that is relatively free of background noise and vibrations. The housing includes a back wall 73 and a removable front wall 74. A tubular sleeve 75 is inserted into cylindrical opening 69 and an inner member 76 is slidably contained within the sleeve upon and bearings 77 and 78. The inner member has a tapered friction control surface 79 which coacts with a second non-tapered friction control surface 80 on the inside wall of the sleeve. The two control surfaces define an elongated orifice 81 of a predetermined length.

An inlet 82 supplied fluid to the entrance region of the orifice. The inlet is connected to a variable pressure compensating pump (not shown) capable of delivering fluid to the inlet at a desired pressure level. The discharge end of the orifice is connected to an exit 84 which, in turn, is connected to a supply tank (not shown) whereby the exit region is maintained at a second constant pressure that is lower than the inlet pressure.

A pair of mechanical actuators 86 and 87 are threaded into the end walls of the housing and are operatively connected to the inner member 76 so that the inner member can be selectively positioned within the sleeve to control the rate of flow through the orifice. The length of the control orifice is 1.276 inches and the angle of divergence between the two friction control surfaces is 0.53 degrees. The maximum diameter at the orifice entrance is 4.5 inches. These dimensions were determined as described above to insure that the flow remained attached to the control surfaces at a maximum ΔP and checked empirically to insure that the dynamic pressure did not exceed the static pressure at any point along the length of the orifice.

An accelerometer capable of detecting vibrations in a range between 0 and 20,000 $H_Z$ was attached to the controller. The output of the accelerator was connected to an analyzer which plotted the spectrum of vibrations generated in the controller structure. The plots developed were recorded for evaluation. With the pump off, and the entrance to the orifice closed, a first series of readings were taken to record the background noise over the accelerometer range The background noise curve 90 is shown plotted on the graphic representation illustrated in FIGS. 6 and 7 where noise in decibels is plotted against noise frequency in $H_Z$. The inner member was then adjusted to permit about 44 gallons of fluid to pass through the orifice and two runs were carried out under slightly different operating conditions.

Figure 6:
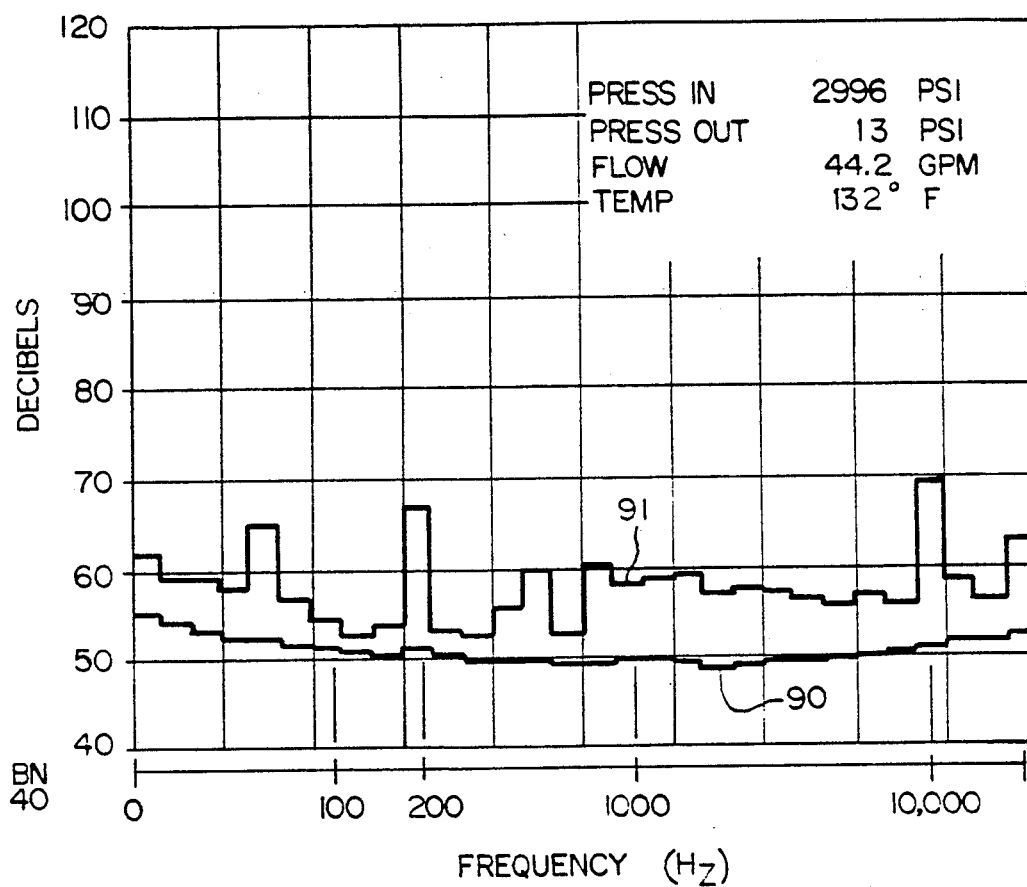
FIG. 6 is a diagrammatic representation showing the noise produced by the flow controller shown in FIG. 5 for a first set of operating parameters.

The results of the first run are graphically illustrated in FIG. 6 by curve 91. During this run, the inlet pressure was set at about 2996 psi and the outlet pressure at about 13 psi so that the ΔP over the orifice was 2983 psi. The temperature of the fluid, which for both test runs was medium weight oil, was maintained at 132° F. As can be seen from the curve 91, low frequency characteristic pump noise is discernable in the 50 to 200 $H_Z$ range. This pump noise reached a level somewhat under 70 decibels. Isolated flow related noise occurs at about 10,000 $H_Z$ which is indicative of extremely minor disturbances reaching a level of about 70 decibels. It should be noted that the noise readings are sensor readings at the surface of the controller and that noise at these levels are not perceptible a short distance from the controller.

Figure 7:
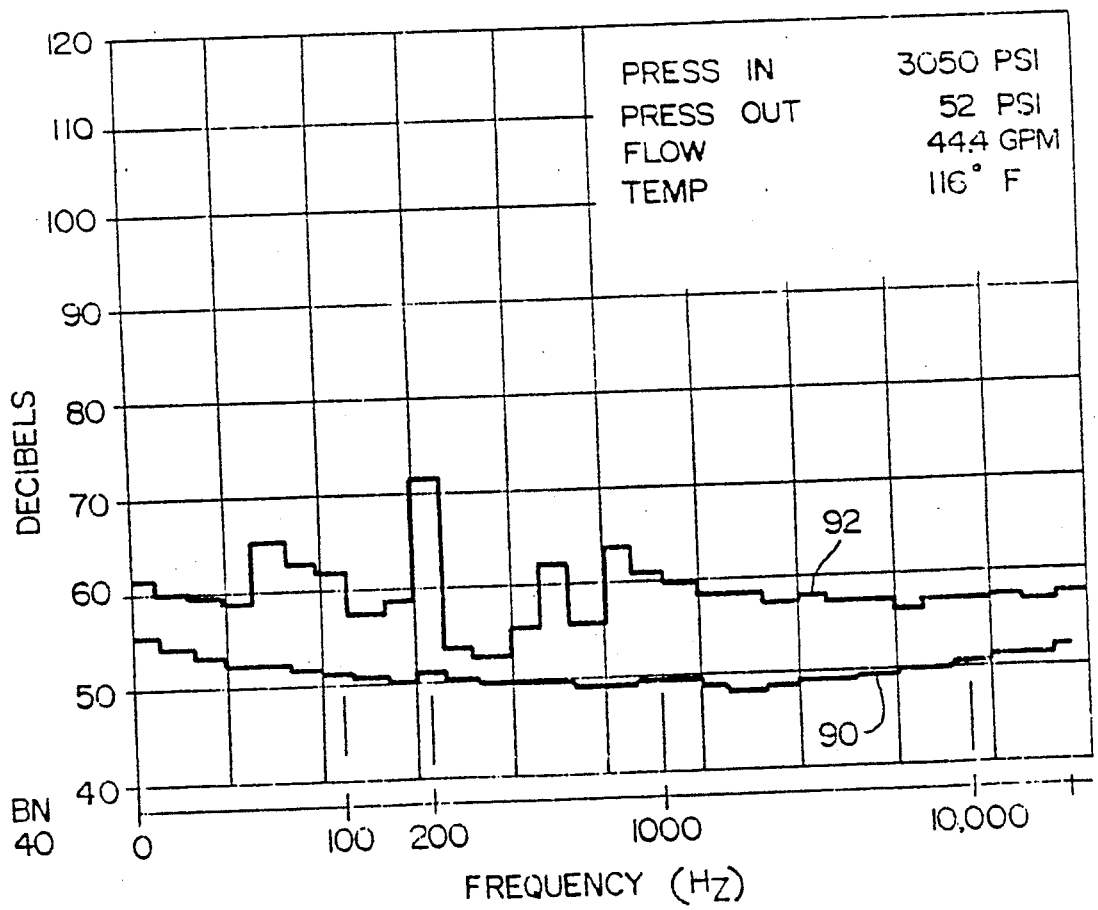
FIG. 7 is also a diagrammatic representation showing the noise produced by the flow controller illustrated in FIG. 5 for a second set of operating parameters.

A second run similar to the first was carried out and the recorded noise data shown by curve 92 in FIG. 7. During the second run, flow rate was again set at 44 gallons per minute with slightly different inlet and outlet pressures. Inlet pressure was set at 3050 psi, while the outlet pressure was set at 52 psi producing a ΔP over the orifice of 2998 psi. Here the temperature of the fluid was reduced to about 116° F. Under these conditions, the pump and background noise remained about constant, however, all high frequency flow related noise was substantially eliminated.

These tests clearly show the effectiveness of the present design approach and clearly demonstrates that the present fluid friction controller is capable of performing quietly under varying flow conditions. While this invention has been described in detail with respect to a single preferred embodiment, it should be understood that the invention is not limited to that precise embodiment. Rather, many modifications and variations would present themselves to those of skill in the art without departure from the scope and spirit of this invention, as defined in the appended claims.

What is claimed is:

1. A flow control apparatus for preventing a generation of noise within a flow system that includes an outer member having a first friction control surface and an inner member having a second friction control surface that coact to define an elongated orifice having a predetermined length, said control surfaces diverging linearly at an angle of divergence from an annular fluid inlet region toward an annular fluid exit region, pressure control means for maintaining a pressure difference between the inlet and exit regions at or below a maximum value, wherein the length of the orifice and the angle of divergence are related to the pressure difference over the orifice such that fluid passing through said orifice exerts a dynamic and a static pressure and remains attached to the friction control surfaces along the orifice, the dynamic pressure being less than the static pressure in the flow at any point along the length of said orifice.

2. The apparatus of claim 1 that further includes control means for positioning one of said outer and inner members in reference to the other of said outer and inner members to regulate a rate of flow through the orifice.

3. The apparatus of claim 2 wherein said orifice is annular in shape.

4. The apparatus of claim 1 wherein the friction control surfaces are linear with respect to the flow.

5. The apparatus of claim 4 wherein the friction control surfaces diverge uniformly along the length of the orifice in the direction of flow.

6. The apparatus of claim 1 that further includes an adjusting means for moving one of said friction control surfaces toward and away from said other friction control surface to uniformly enlarge and constrict said orifice uniformly along the length of said orifice.

7. The apparatus of claim 1 that further includes a pivot means associated with one of said friction control surfaces to permit the angle of divergence of said orifice to be selectively adjusted.

8. The apparatus of claim 1 that further includes a positioning means for selectively positioning one of said outer and inner members axially in relation to the other of said outer and inner members so that a rate of flow through the orifice can be controlled within a given range.

9. The apparatus of claim 1 that includes further means of controlling the pressure at the exit region so that when fluid flows through said exit region the pressure of said fluid exceeds a vapor pressure thereof.

10. The apparatus of claim 2 wherein the length of the orifice and the angle of divergence are related to the pressure difference over the orifice by the relationship:

$$\Delta P = \frac{\ln\left[\left(1 + \frac{12\,Q\mu L}{\pi D C^3}\right)\frac{(2 + t/c)}{2(1 + t/c)^2} \cdot H\right]}{H}$$

where:
ln is the natural logarithm operator
H is a constant relating to fluid properties
Q is a rate of flow through the orifice
L is the length of the orifice
$\mu$ is the fluid viscosity
C is a clearance at the orifice
D is a maximum diameter of the outer friction control surface,
$\theta$ is the angle of divergence
t is tangent $\theta \cdot L$.

11. A method of preventing noise producing vibrations in a flow controller that includes
placing a pair of linear friction control surfaces in face-to-face relationship within a fluid stream to define an elongated orifice having a length that extends between an annular fluid inlet region and an annular fluid exit region and further having a clearance at said inlet region,
creating a pressure differential between said inlet and exit regions,
controlling the pressure differential so as not to exceed a maximum value, and
positioning the friction control surfaces so that said friction control surfaces diverge from the inlet region toward the exit region at an angle of divergence, wherein the length of the orifice and the angle of divergence are related to the pressure differential so that fluid passing through the orifice exerts a static and a dynamic pressure and remains attached to the friction control surfaces along the entire length of the orifice and dynamic pressure does not exceed static pressure in the flow at any point along the length of the orifice when the pressure differential is at or below the maximum value.

12. The method of claim 11 that includes the further step of selectively repositioning one friction control surface in respect to the other to regulate the flow through the orifice.

13. The method of claim 12 wherein said one friction control surface is moved toward and away from the other friction control surface to change the area of the orifice without changing the angle of divergence.

14. The method of claim 12 wherein said one friction control surface is repositioned with respect to the other to change the angle of divergence of said orifice.

15. The method of claim 12 wherein the friction control surfaces are circular in form and including the further step of axially positioning one surface with respect to the other to control the flow through the orifice.

16. The method of claim 12 that includes the further step of maintaining the pressure at the inlet region above the vapor pressure of the fluid.

17. The method of claim 11 wherein the length of the orifice and the angle of divergence are related by the relationship:

$$\Delta P = \frac{\ln\left[\left(1 + \frac{12\,Q\mu L}{\pi D C^3}\right)\frac{(2 + t/c)}{2(1 + t/c)^2} \cdot H\right]}{H}$$

where:
ln is a natural logarithm operator
H is a constant relating to fluid properties
Q is a rate of flow through the orifice
L is the length of the orifice
$\mu$ is a fluid viscosity
C is the clearance at the orifice entrances
D is a maximum diameter of the outer friction control surface
$\theta$ is the angle of divergence, and
t is tangent $\theta \cdot L$.

* * * * *